Patented Apr. 19, 1932

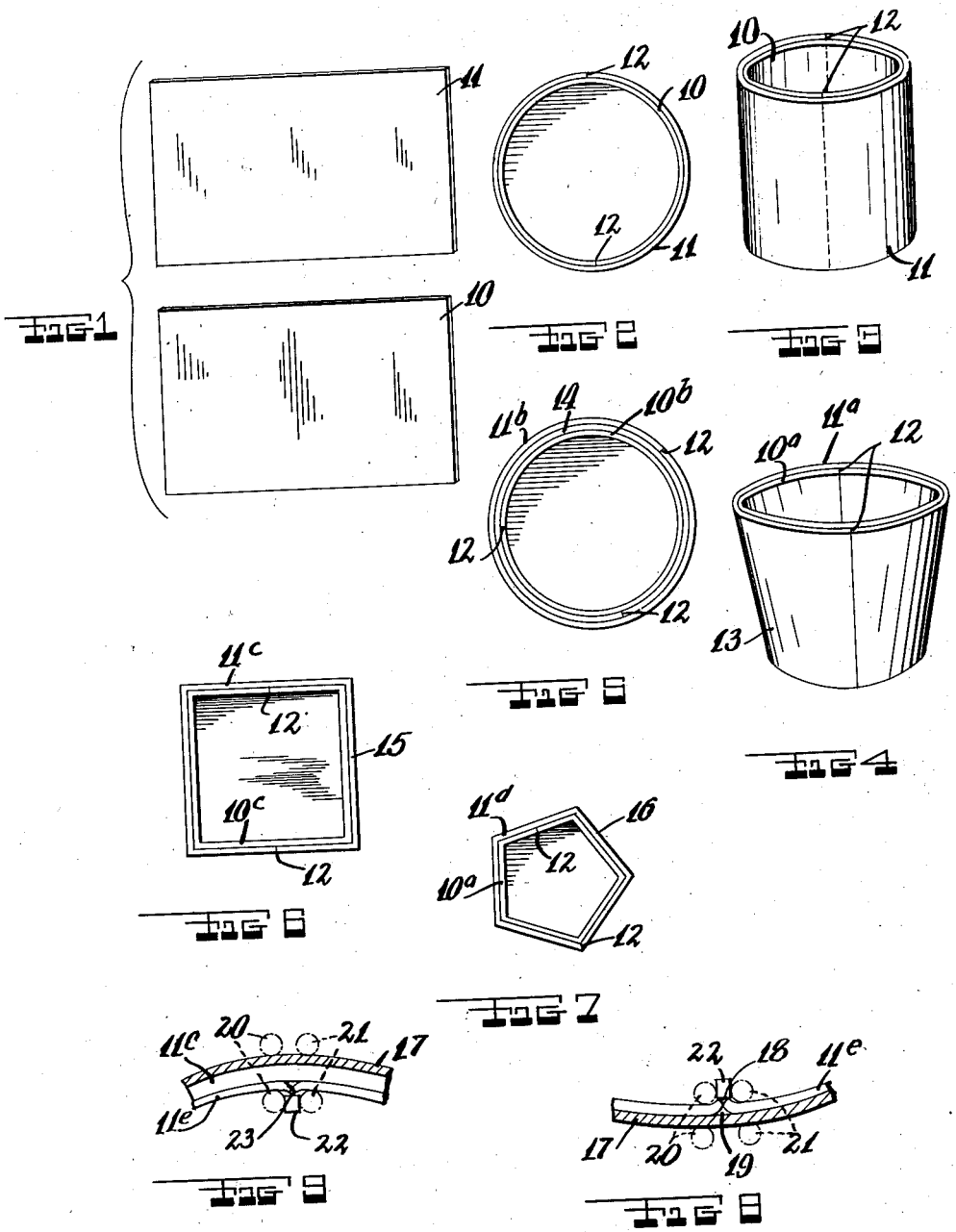

1,855,041

UNITED STATES PATENT OFFICE

ANDREW BODONY, OF NEW YORK, N. Y.

METHOD OF MANUFACTURING TUBES, CONTAINERS, CUPS, AND THE LIKE

Application filed April 23, 1930. Serial No. 446,487.

This invention relates to tubes, containers, cups and the like and a method for their manufacture.

The invention has for an object the provision of a device of the class mentioned which is of simple durable construction, dependable in use and efficient in action, and which can be manufactured and sold at a reasonable cost.

The invention proposes a method for the manufacture of the above mentioned article which includes the attaching of a plurality of sheet layers to each other with glue, cement or the like in superimposed conditions and in tubular or the like formation, and arranging the layers prior to the attaching so that the edges of each layer are in edge contacting condition, and the seams of one joint being out of the vicinity of the seams of the other joint or joints.

The invention also proposes steps for the obtaining of perfect edge contacting relation of the edges of the layers.

The invention also proposes a tube, container, cup or the like consisting of a plurality of sheet layers attached together with interposed glue, cement or the like, and in superimposed relations and in tubular or the like formation, the side edges of each layer being in edge contacting relations, and the seams of all of the layers formed by said contacting edges being in individually different vicinities to each other.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective developed view of the layers used in this invention.

Fig. 2 is a plan view of a tube constructed according to this invention.

Fig. 3 is a perspective view of Fig. 2.

Fig. 4 is a view similar to Fig. 3, but illustrating a frusto-conical tube.

Fig. 5 is a view similar to Fig. 2, but illustrating another modification.

Figs. 6 and 7 are plan views similar to Fig. 2, but illustrating further embodiments of the invention.

Fig. 8 is a fragmentary view of a form and sheet layer engaged therein for illustrating the method of treating the edges of the sheet layer.

Fig. 9 is a view similar to Fig. 8, but showing two layers engaged in the form.

The tube shown in Figs. 2 and 3 consists of a plurality of sheet layers 10 and 11 attached together with interposed glue, cement or the like, and in superimposed relations and in tubular formation, the side edges 12 of each layer being in edge contacting relations, and the seams of all the layers formed by said contacting edges being in individually different vicinities to each other. As shown on the drawings, these seams are directly opposite each other.

In Fig. 1 the numeral 10 indicates a developed view of the inner sheet used in Fig. 2, numeral 11 a developed view of the outer sheet. Particular attention is called that the sheet 10 is slightly shorter than the sheet 11 so that it may fit within the sheet 11 when the tube is formed. The heights of the two sheets may be equal or slightly different if this is desirable. The tube shown in Figs. 2 and 3 is of cylindrical form.

In Fig. 4, a frusto-conical tube 13 has been illustrated which differs only from the tube shown in Fig. 3 in that its sides are at a slope. It is made from two layers of material indicated by reference numerals 10ª and 11ª, and the edges of these layers are in edge contacting relation with each other, while the seams are arranged diametrically opposite each other. The layers are secured together by gluing, cementing or the like.

In Fig. 5, another modified form of the device has been shown which is very similar to the form shown in Fig. 2, but distinguishes in that a third layer has been shown indicated by reference numeral 14. This layer is arranged between the outer layer 11ᵇ and the inner layer 10ᵇ. The edges of all of these layers are in edge contacting relations with each other. The seams formed by these edges are at angles of 120° from each other.

In Fig. 6, another embodiment of the invention has been disclosed in which application has been made to a rectangular tube 15. This tube is formed from an outer sheet layer 11$^c$ and an inner sheet layer 10$^c$. The edges of the layers are in edge contacting relation, similar to the previous described forms. The seams formed by these edges are diametrically opposite each other and, as shown on the drawings, formed on one of the straight sides.

In Fig. 7, another embodiment has been shown in which the invention is applied to a pentagonal tube 16. This tube is formed from a plurality of layers, namely an outer layer 11$^d$ and an inner layer 10$^d$. These layers have their edges in edge contacting relations with each other and the seams formed by the edges are substantially diagonally opposite each other.

In Figs. 8 and 9, a form 17 has been shown for the accomplishing of various steps for obtaining perfect edge contacting relations of the edges of the layers of the various tubes. The form 17 as shown on the drawings, is merely that of a cylinder. The outer layer 11$^e$ of an article as previously described is engaged within the form and is of such length that it snugly fits flush against the interior face of the form with the ends 18 when in edge contacting relations slightly projecting inwards. This leaves an open space 19 between the in-bulged ends and the material of the form 17.

The above constitutes the first step in the formation of the article. The next step consists in clamping the edges 18 tightly against the form 17. This is indicated by dot and dash lines 20 and dot and dash lines 21. The dot and dash lines 20 represent rods clamped positioned on the outer side of the form and on the inner side of the layer 11$^b$. The dot and dash lines 21 indicate other rods arranged on the outer side of the form 17 and on the inner side of the layer 11$^e$. These rods must be tightly clamped in place so that when in-bulging ends 18 are pressed against the form, as hereinafter stated, the material of the layer cannot slip past the rods. Next an implement, indicated by dot and dash lines 22, is forced against the in-bulged edges 18 and firmly flattens them out against the form. During this flattening operation the fibers of the edges slightly disintegrate and engage each other so that they are locked closed. This is very important in that when the next step is taken, the gluing step, the glue will not readily sipe thru the seam.

After the bulge of the edges 18 has been flattened out the rods 20 and 21 are removed and glue, cement or other material applied upon the inside of the layer 11$^e$ without its removal from the form 17. Next the inner layer 10$^e$ is engaged within the outer layer 11$^e$ and is of such length that when the edges 23 are in edge contacting relations, they bulge slightly inwards from the outer layer 11$^e$. Next the clamping rods 20 and 21 are again applied in a fashion very similar to the one previously described and the implement 22 engaged between the rods for forcing the bulged edges flat against the outer layer so that the fibers of the edges slightly disintegrate and engage each other.

Tubes, container, cups and the like constructed according to this invention are very strong and in addition are impervious to water for a long period of time. Since the seams of the different layers are not in the same vicinities and if water tends to gradually dissolve the glue or cement, it will take a long time before leaking occurs, since the water will have to travel along quite a long path. In addition, the treating of the contacting edges of the various layers as called for produces a joint together with the cement or glue, which does not disintegrate very rapidly.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A method for the manufacture of tubes, containers, cups and the like, consisting of attaching a plurality of sheet layers to each other with glue, cement or the like, in superimposed conditions and in tubular or the like formation, and arranging layers prior to the attaching so that the edges of each layer are in edge contacting condition, the seams of one joint being out of the vicinity of the seams of the other joint or joints, and steps for obtaining perfect edge contacting relations of the edges of the layer including placing the edges in edge contacting bulged relation, and then forcing the bulged portions straight so that the fibers thereof interlock.

2. A method for the manufacture of tubes, containers, cups and the like, consisting of attaching a plurality of sheet layers to each other with glue, cement or the like, in superimposed conditions and in tubular or the like formation, and arranging layers prior to the attaching so that the edges of each layer are in edge contacting condition, the seams of one joint being out of the vicinity of the seams of the other joint or joints, and steps for obtaining perfect edge contacting relations of the edges of the layer, said steps including clamping the edges of the layers against longitudinal movements so that when in edge contacting relation they are slightly ulged, and then forcing the bulged portion straight for disintegrating the fibers of the edges and obtaining interlocking.

3. A method for the manufacture of tubes, containers, cups and the like, consisting of attaching a plurality of sheet layers to each other with glue, cement or the like, in superimposed conditions and in tubular or the like formation and arranging layers prior to the attaching so that the edges of each layer are in edge contacting condition, the seams of one joint being out of the vicinity of the seams of the other joint or joints, and steps for obtaining perfect edge contacting relations of the edges of the layer, including clamping of edges accomplished by rods, said steps comprising the engagement of the layers against the inner side of a cylindrical form so that when in edge contacting relation they are slightly bulged, the clamping of the layers against the form so as to prevent longitudinal movements, and then forcing the bulged portion straight for disintegrating the fibres of the edges and obtaining interlocking.

4. A method for the manufacture of tubes, containers, cups and the like, consisting of attaching a plurality of sheet layers to each other with glue, cement or the like, in superimposed conditions and in tubular or the like formation, and arranging layers prior to the attaching so that the edges of each layer are in edge contacting condition, the seams of one joint being out of the vicinity of the seams of the other joint or joints, and steps for obtaining perfect edge contacting relations of the edges of the layer, including clamping of edges accomplished by rods, said steps comprising the engagement of layers against the inner side of a cylindrical form so that when in edge contacting relation they are slightly bulged, the engagement of rods against the layers and the form for preventing longitudinal movements of the layers, and then the forcing of a block against the bulged edges for forcing them straight and disintegrating the fibres of the edges and obtaining interlocking.

In testimony whereof I have affixed my signature.

ANDREW BODONY.